(12) United States Patent
Smyth et al.

(10) Patent No.: US 8,966,093 B2
(45) Date of Patent: Feb. 24, 2015

(54) SEAMLESS HAND-OFF OF COMBINED UNIFIED COMMUNICATIONS AND VIRTUAL DESKTOP INFRASTRUCTURE SESSIONS

(75) Inventors: Joseph Enda Smyth, Galway (IE); Brian Dal Bello, Allen, TX (US); Liam Patrick O'Gorman, County Limerick (IE)

(73) Assignee: Cisco Technology, Inc., San Jose, CA (US)

( * ) Notice: Subject to any disclaimer, the term of this patent is extended or adjusted under 35 U.S.C. 154(b) by 338 days.

(21) Appl. No.: 13/487,338

(22) Filed: Jun. 4, 2012

(65) Prior Publication Data

US 2013/0326072 A1 Dec. 5, 2013

(51) Int. Cl.
*G06F 15/16* (2006.01)

(52) U.S. Cl.
USPC ........................................................ 709/227

(58) Field of Classification Search
USPC ........................................................ 709/227
See application file for complete search history.

(56) References Cited

U.S. PATENT DOCUMENTS

| | | | |
|---|---|---|---|
| 7,831,207 B2 | 11/2010 | Mercurio et al. | |
| 2007/0198656 A1* | 8/2007 | Mazzaferri et al. | 709/218 |
| 2011/0145418 A1* | 6/2011 | Pratt et al. | 709/227 |
| 2011/0250842 A1 | 10/2011 | Stafford et al. | |

OTHER PUBLICATIONS

Cisco, "Rich Media in VXI," White Paper, 2012.
Cisco, "Cisco Collaboration Clients and Applications," Cisco Unified Communications System 8.x SRND, Chapter 24, Jan. 12, 2012.

* cited by examiner

*Primary Examiner* — Tu Nguyen
(74) *Attorney, Agent, or Firm* — Edell, Shapiro & Finnan, LLC

(57) ABSTRACT

A host device receives from a user at a first client device a first login request for hosted virtual desktop (HVD) services. A first virtual desktop infrastructure (VDI) session is started upon receiving a valid first login request. A first unified communications (UC) session is established between the first client device and an endpoint device. A second login request is received from the user at a second client device, the second login request configured to request HVD services. A second VDI session is started to mediate an HVD session for the user upon receiving a valid second login request. A second UC session is established between the second client device and the endpoint device. A media communication session associated with the first UC session is transferred from the first client device to the second client device after the second VDI session is started and the second UC session is established.

27 Claims, 5 Drawing Sheets

SEAMLESS HAND-OFF OF COMBINED UNIFIED COMMUNICATIONS AND VIRTUAL DESKTOP INFRASTRUCTURE SESSIONS

The present disclosure relates to seamless hand-off combined Unified Communications (UC) and Virtual Desktop Infrastructure (VDI) sessions between client endpoint devices serving the same user.

BACKGROUND

The field of UC is a growing technology that unifies various forms of human communication via a device into a common user experience. UC may integrate real-time communications services such as instant messaging and presence, telephony, and video conferencing with other communications services such as voicemail, email, facsimile, and short messaging services. UC also attempts to achieve media independence. For example, an individual may be in a meeting and receive a call that cannot be accepted during the meeting. Sometime later, a voicemail notification is received, but the voicemail may not be retrievable by a phone call without disrupting the meeting. UC techniques allow the individual to receive a text version of the voicemail on a handheld device that was converted to text by a voice recognition tool. In this way, UC can increase human productivity by reducing communications latency.

UC may be virtualized, that is, the UC application may run in a hosted virtual desktop (HVD) while the user interface for the application is displayed on a remote client endpoint device. Virtualized UC presents a set of unique problems in that media such as audio and video may be more difficult to virtualize than simple text and graphics. The HVD session is mediated by a VDI link that renders hosted operations on the client desktop by processing client mouse and keyboard inputs on the host with the host sending the resultant video to the client, while media for phone and video calls are mediated by a media link, e.g., a Real-time Transport Protocol (RTP) link.

UC sessions are organized into calls, similar to ordinary telephony calls. The protocols to establish these calls can either be first-party call control protocols, where one of the endpoints participating in the call requests changes to the call state directly, or third-party call control protocols, where an entity that is not one of the endpoints participating in the call requests changes to the call state on behalf of one or more of the endpoints participating in the call. In third-party call control, the protocol used to request call state changes is sometimes referred to as a computer telephony interface (CTI).

DESCRIPTION OF EXAMPLE EMBODIMENTS

Overview

Techniques are provided for seamless hand-off of combined unified communications and virtual desktop infrastructure sessions. A host device receives from a user at a first client device a first login request configured to request hosted virtual desktop services. A first virtual desktop infrastructure session is started in order to mediate a hosted virtual desktop session when a valid first login request is received. A first unified communications session is established between the first client device and an endpoint device. A second login request is received from the user at a second client device configured to request hosted virtual desktop services. A second virtual desktop infrastructure session is started to mediate the hosted virtual desktop session for the user when a valid second login request is received. A second unified communications session is established between the second client device and the endpoint device. A media communication session associated with the first unified communications session is transferred from the first client device to the second client device after the second virtual desktop infrastructure session is started and the second unified communications session is established.

Example Embodiments

Figure 1:
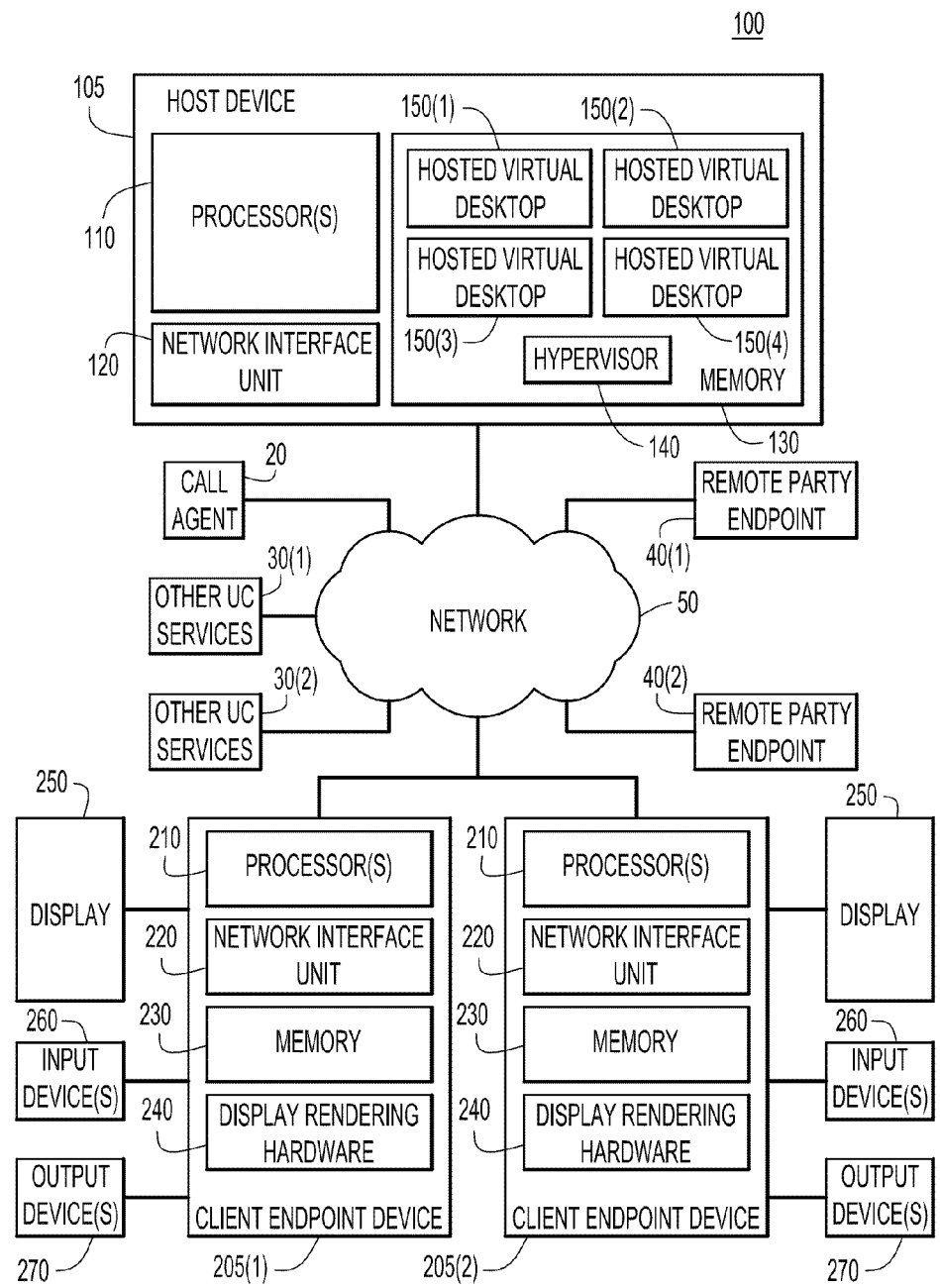
FIG. 1 is an example of a block diagram showing a UC environment in which UC connectivity can be established between client endpoint devices and remote party endpoints under the control of one or more hosted virtual desktops according to the techniques described herein.

Referring to FIG. 1, an example of a block diagram showing a unified communications (UC) environment 100 in which UC connectivity can be established between client endpoint devices and remote party endpoints under the control of one or more hosted virtual desktops is shown in FIG. 1. The depicted UC environment 100 includes host device 105, client endpoint devices 205(1), 205(2), call agent 20, other UC services 30(1), 30(2), and remote party endpoints 40(1), 40(2), which are connected over network 50 to each other. The UC environment may include additional servers, clients, and other devices not shown, and individual components of the system may occur either in single instances or multiple instances. For example, there may be more than one host device 105, and other networking components, e.g., routers and switches, may be used in the UC environment 100.

Network 50 represents any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement. The various components of the UC environment 100 may include any conventional or other communications devices to communicate over the networks via any conventional or other protocols, and may utilize any type of connection (e.g., wired, wireless, etc.) for access to the network.

Call agent 20 is a primary call agent or media gateway controller for controlling a UC call (e.g., a video conference call), signaling among the various endpoints in the UC environment 100. The call agent 20 may be an off-the-shelf call agent, e.g., Cisco's Unified Communications Manager (CUCM). Other UC services modules 30(1), 30(2) represent agents for other UC communications types, e.g., instant messaging and presence, voicemail, email, and gateways for PSTN, facsimile, and short messaging services.

Remote party endpoints 40(1), 40(2) may be any suitable telephony device such as a soft phone on a desktop computer, a plain old telephone system (POTS) device, cellular phone, private branch exchange (PBX) device, video incapable phone, or any other suitable telephony device.

Figure 2:
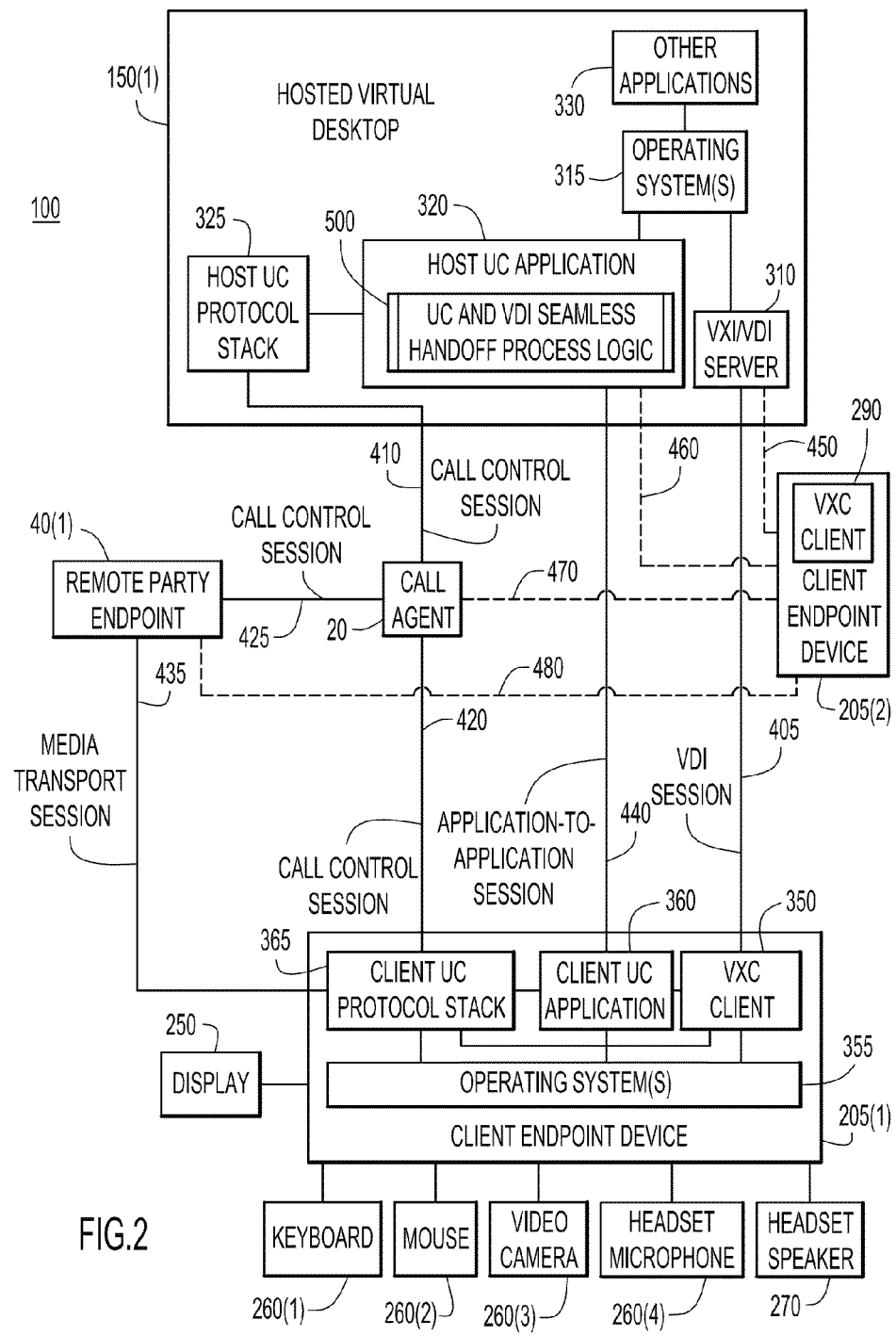
FIG. 2 is an example of a block diagram of the relevant portions of FIG. 1 for illustrating an overview of a seamless hand-off for combined UC and VDI sessions according to the techniques described herein.

Host device 105 comprises one or more processors 110, a network interface unit 120, and memory 130. The processor 110 is, for example, a data processing device such as a microprocessor, microcontroller, systems on a chip (SOCs), or other fixed or programmable logic, that executes instructions for process logic stored in memory 130. The network interface unit 120 enables network communication throughout the UC environment, as shown in FIGS. 1 and 2. Memory 130 may be implemented by any conventional or other memory or storage device, and may include any suitable storage capacity. For example, memory 130 may comprise read only memory (ROM), random access memory (RAM), erasable programmable read-only memory (EPROM), magnetic disk storage media devices, optical storage media devices, flash memory devices, electrical, optical, or other physical/tangible (non-transitory) memory storage devices. The memory 130 may comprise one or more computer readable storage media (e.g., a memory device) encoded with software comprising computer executable instructions and when the software is executed (by processor 110) it is operable to perform the operations described herein in connection with FIG. 4.

The host device 105 may be, for example, a computing blade, a blade server comprising one or more solid state drives, or a blade center comprising one or more blade servers together with a blade chassis comprising common resources such as networking connections, input/output device connections, power connections, cooling devices, switches, etc. The host device 105 may be a component of a larger system, such as a Cisco Unified Computing System (CUCS), or a data center that centralizes enterprise computing resources.

Resident in memory 130 are hypervisor 140, and multiple hosted virtual desktops (HVDs) 150(1)-150(4). The hypervisor or virtual machine monitor 140 presents a virtual operating platform to the HVDs 150(1)-150(4), and manages access to the host processor 110, network interface unit 120, memory 130 and other host resources, so that the HVDs 150(1)-150(4) have access to appropriate host resources without disrupting each other's operation. Each HVD 150(1) operates independently of the other HVDs and runs as a separate virtual machine on the host device 105, and each HVD may run a different operating system (OS) if desired. Further operation of the HVDs is explained below with reference to FIGS. 2, 3A, 3B and 4.

Each of the example client endpoint devices 205(1) and 205(2) comprises one or more processors 210, a network interface unit 220, memory 230, and display rendering hardware 240. The processor 210 is, for example, a data processing device such as a microprocessor, microcontroller, systems on a chip (SOCs), or other fixed or programmable logic, that executes instructions for process logic stored in memory 230. The network interface unit 220 enables communication throughout the UC environment, as shown in FIGS. 1 and 2. Memory 230 may be implemented by any conventional or other memory or storage device, and may include any suitable storage capacity. For example, memory 230 may comprise ROM, RAM, EPROM, magnetic disk storage media devices, optical storage media devices, flash memory devices, electrical, optical, or other physical/tangible (non-transitory) memory storage devices. The memory 230 may comprise one or more computer readable storage media (e.g., a memory device) encoded with software comprising computer executable instructions and when the software is executed (by processor 210) it is operable (or otherwise causes the processor 210) to perform the operations described herein in connection with FIGS. 2, 3A, 3B and 4. Display rendering hardware 240 may be a part of processor 210, or may be, e.g., a separate graphics processor, e.g., a Graphics Processor Unit (GPU).

The example client endpoint devices 205(1) and 205(2) may be any conventional or other computer system or device, such as a thin client, computer terminal or workstation, personal desktop computer, laptop or netbook, tablet, cellular phone, set-top box, networked television, or other device capable of acting as a client in the described UC environment. The client endpoint device 205(1) may be used alone, or in conjunction with and optional telephony device, which may be, for example, a telephony headset, plain old telephone system (POTS) device, cellular phone, private branch exchange (PBX) device, video incapable phone, or any other suitable telephony device.

The example client endpoint devices 205(1) and 205(2) interface with display device(s) 250, input device(s) 260, and output device(s) 270, and communicates with these devices in any suitable fashion, e.g., via a wired or wireless connection. The display device(s) 250 may be any suitable display, screen or monitor capable of displaying information to a user of a client endpoint device, for example the screen of a tablet or the monitor attached to a computer workstation. Input device(s) 260 may include any suitable input device, for example, a keyboard, mouse, trackpad, touch input tablet, touch screen, camera, microphone, remote control, speech synthesizer, or the like. Output device(s) 270 may include any suitable output device, for example, a speaker, headphone, sound output port, or the like.

The display device(s) 250, input device(s) 260 and output device(s) 270 may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device. If the client endpoint device 205(1) is used in conjunction with a telephony device, then the components of the telephony device may be used as input and/or output devices. For example, if the telephony device is a PBX video-incapable device having a keypad and a standard telephone handset having a microphone and a speaker, then the client endpoint device 205(1) may accept input via the keypad and the handset microphone, display video on display screen 250, and output audio to the handset speaker.

The functions of the processors 110 and 210 may each be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memories 130 and 230 each store data used for the computations or functions described herein (and/or to store software or processor instructions that are executed to carry out the computations or functions described herein). Alternatively, one or more computer readable storage media are provided and encoded with software comprising computer executable instructions and when the software is executed operable to performing the techniques described herein. Thus, functions of the process logic as described with reference to FIGS. 3A, 3B and 4, for example, may be implemented with fixed logic or programmable logic (e.g., software or computer instructions executed by a processor or field programmable gate array (FPGA)).

In a conventional HVD environment, a client endpoint device, e.g., client endpoint device 205(1), may be in a call or UC session with a remote party endpoint, e.g., remote party endpoint 40(1), and a user using endpoint 205(1) place the call on hold and subsequently pick up the call on endpoint 205(2) which may be a tablet device or mobile phone that allows the user to continue the call in a mobile fashion. However, there is no mechanism to seamlessly transfer a desktop share session that employs an UC session (with call) and a VDI session to another device by virtue of the user logging in to another endpoint device.

By virtue of the techniques described herein, a Virtual Experience Client (VXC) comprises a VDI client tightly integrated with a Session Initiation Protocol (SIP) stack and media engine capable of handling voice and video sessions in addition to the VDI session. If a user has a desktop or application shared session with another endpoint, plus any audio and video conference in progress, and then the user decides to move to another device (e.g. tablet device or a desktop with a window view), when the user logs in to an HVD session on the second device (which triggers the original VDI session to disconnect) the tight integration is leveraged so that when the VDI session is disconnected, rather than end the associated Voice and Video sessions, the calls are placed on hold in the communications manager, e.g., call agent 20, using CTI signaling. Placing the call on hold allows the calls to be offered to the SIP stack associated with the newly established VDI session on the second device, thereby allowing the voice and video elements of the conference to be seamlessly handed-off to the second device. In this manner, the user has moved a full conference (desktop share, voice, and video) from, for example, a fixed thin client device, to a mobile tablet with a seamless hand-off of all elements of the conference. These seamless hand-off techniques are further described in connection with the remaining figures.

Turning now to FIG. 2, a block diagram is now described for virtual desktop interface (VDI), UC control, and audio/video streaming sessions among HVD 150(1), client endpoint device 205(1), and remote party endpoint 40(1) in the UC environment 100. For purposes of simplification, the other components of the UC environment 100, e.g., other remote party endpoint devices, are not shown in FIG. 2. Further, although the description refers to the interaction between one HVD 150(1) and client endpoint devices 205(1) and 205(2), each client endpoint device 205(1) and 205(2) may interact with one or more HVDs 150 on a single or multiple host devices 105. Moreover, there may be more than one call agent in the UC environment 100, for example a backup call agent in addition to the (primary) call agent 20, or other arrangement to provide for survivable remote site telephony (SRST), for example.

The example HVD 150(1) comprises a Virtualization Experience Infrastructure (VXI)/VDI server 310, host operating system(s) 315, host UC application 320, host UC protocol stack 325, and may also comprise one or more other application(s) 330. The VXI/VDI server 310 may be a standalone process as depicted, or it may be implemented as part of another process, for example it may be partially implemented in hypervisor 140. The example client endpoint device 205(1) comprises a Virtualization Experience Client (VXC) 350 with a built in VDI client, operating system(s) 355, client UC application 360, and client UC protocol stack 365, all of which reside in memory 230 (as shown in FIG. 1), and also comprises a display 250, input devices including keyboard 260(1), mouse 260(2), digital video camera 260(3) and headset microphone 260(4), and output devices including headset speaker 270. The client UC protocol stack 365 may also be referred to as a UC client software stack, e.g., a Client Services Framework (CSF) stack.

The VXI/VDI server 310 interacts with the VXC 350 to provide virtual desktop interface functionality to the client endpoint device 205(1) over VDI session 405, which is a VDI protocol link that is established using any suitable VDI protocol, for example Microsoft Remote Desktop Protocol (RDP), Citrix Systems Independent Computing Architecture (ICA), VMWare PC over IP (PCoIP), or other suitable protocol. For example, some applications (e.g., Microsoft Word or AutoCAD) with which a user of the client endpoint device 205(1) is interacting are hosted by the HVD 150(1), while the user interface, e.g., a graphical user interface (GUI), associated with the application(s) is rendered by the client endpoint device 205(1). The VXI/VDI server 310 on the host may, for example, receive display output generated by applications 320 and 330, via the host operating system 315, and send it as a VDI image to the VXC 350 over VDI session 405.

The VDI image comprises image information associated with a HVD display, which the client endpoint device 205(1) may modify and render for display as a client endpoint display on display device 250. The HVD display comprises a UC user interface, which when rendered for display at the client endpoint device 205(1) enables a user to manage a UC call session between the client endpoint device 205(1) and a remote party's endpoint device 40(1). The HVD display may also comprise one or more windows for hosted applications 330 and a graphical representation of a desktop environment.

The VXC 350 interacts with client operating system 355 to render the received HVD display for display on the client endpoint device 205(1), e.g., on display 250. The client UC application 360 and/or the client UC protocol stack 365 may also interact with the client operating system 355 to modify the received HVD display, for example by commanding the operating system 355 to insert client-provided user interface elements into the placeholder(s) in the HVD display, prior to rendering it for display on display device 250. The VDI client 350 also receives user input from the user interface, for example, the user types on keyboard 260(1) or exercises mouse 260(2), and these inputs are translated by the VDI client 350 and sent to the VDI server 310 via VDI session 405.

After it receives the user input, VXI/VDI server 310 translates it into virtual keyboard and mouse inputs, and feeds it via host operating system 315 to host UC application 320 or other applications 330, as if the applications and the input devices 260 were running on a single desktop computing device. The user inputs are processed by the appropriate application at the HVD, and user interface (e.g., a GUI) information is generated through the operating system 315 and VXI/VDI server 310 for transmission back to the VXC 350, which renders the user interface for display to the user on display 250. Other I/O associated with other applications 330, e.g., image inputs from digital camera 260(3) and voice inputs from microphone 260(4) that are unrelated to a UC session may be processed in a similar fashion.

In another embodiment, host device 105 may execute hosted virtual applications (HVAs) from its memory 130, rather than full hosted virtual desktops 150. In this embodiment, the memory 130 comprises the VXI/VDI server 310, OS 315, host UC application 320, host UC protocol stack 325, etc. In this HVA embodiment, client endpoint device 205(1) may use its VDI client 350 to interact with multiple host devices 105, each executing one or more HVAs, and use the client operating system 355 to composite the output of the HVAs to present a full windowed desktop on display 250. For example, instead of receiving a single HVD display, the client endpoint device 205(1) may receive multiple HVA displays, each HVA display corresponding to one HVA, including an HVA display corresponding to the UC application and comprising the UC user interface. The client endpoint display is then generated by compositing all of the received HVA displays together, and rendering the client-provided user interface element(s) into the appropriate placeholder(s).

The host UC application 320, for example Cisco Systems' Cisco Unified Personal Communicator (CUPC) or similar application, operates in conjunction with host UC protocol stack 325 to establish and control UC sessions between the client endpoint device 205(1) and a UC endpoint such as remote party endpoint 40(1). UC protocol stack 325 is configured to manage UC sessions in a third-party call control mode. For a UC call session, e.g., a videoconference, the host UC application 320 sends call control requests to the host UC protocol stack 325, which sends call control signals to call agent 20 over call control session 410. The call agent 20 sends UC protocol commands based on the third-party call control signals, e.g., signals associated with call set-up, tear down, or mid-call control, to client UC protocol stack 365 over call control session 420. The client UC protocol stack 365, in response to the call control signals, makes call control requests back to the call agent 20 over call control session 420, which result in signals being sent to remote party endpoint 40(1) over call control session 425.

The call control signals may be in accordance with any suitable protocol, for example Computer Telephony Integration (CTI), CTI-QBE (Quick Buffer Encoding) protocol, or the like. Thus, in an embodiment where CTI is used, the host UC application 320 and the UC protocol stack 325 act as the CTI master, and the client UC protocol stack 365 is a CTI slave. It will be appreciated that remote party endpoint 40(1) may be controlled either through first-party or third-party call control signaling. The UC protocol commands may be sent via any suitable protocol, for example the SIP, Skinny Call Control Protocol (SCCP), or the ITU H.323. The call control requests may be sent via any suitable protocol, for example SIP. Other signaling mechanisms and protocols may be used for the operations described herein, e.g., proprietary call control signaling may be used or call signaling may be encapsulated in VDI session protocols, e.g., using VDI session 405. In one embodiment, the call agent 20 commands the client UC protocol stack 365 to perform actions over call control session 420 via SIP with embedded Remote Call Control (remoteCC) bodies, and requests are initiated by the client protocol stack 365 over call control session 420.

Using call control sessions 425 and 420, call agent 20 mediates the exchange of media capabilities between client UC protocol stack 365 and remote party endpoint 40(1), allowing media transport session 435 to be established directly between remote party endpoint 40(1) and client endpoint 205(1). The client UC protocol stack 365 and the remote party endpoint 40(1) communicate media data associated with the UC call session to each other via media transport session 435, without the communication data passing through the HVD 150. The media data may be, for example, rich media data such as audio and/or video data, and may be encoded or compressed in any suitable fashion, for example using UC voice and video codecs, and transmitted via any suitable protocol, for example the Real-time Transport Protocol (RTP).

In one example, an application-to-application session 440 is established between the host UC application 320 and the client UC application 360. The application-to-application session 440 may be used to communicate any desired information between the two UC applications, for example user interface geometry information such as metadata that describes the size and location of some user interface elements in the HVD display, identity information that enables the client UC application 360 to register the client endpoint device 205(1) with the call agent 20, configuration information, or call state and client endpoint state information such as call state and client endpoint state information that cannot otherwise be communicated via the third-party call control sessions 410, 420. The application-to-application session 440 (also referred to as an inter-application session) may be established using any suitable protocol, for example as a virtual channel within the VDI session 405, and in another embodiment the inter-application session 440 may be transported independently using HTTP, Transport Layer Security (TLS), or Transmission Control Protocol (TCP).

In other embodiments where the inter-application session 440 is not utilized, the information that would be transmitted via the inter-application session 440 may be transmitted in a different manner, for example a call control protocol may be chosen to permit information such as configuration information to be transmitted via the third-party call control sessions 410, 420, or for example, the VDI session 405 may be used to transmit VDI images.

The various operating systems mentioned with reference to FIG. 1 and FIG. 2, such as the host operating system(s) 315 and the client operating system(s) 355 may be any suitable operating system for use in the UC environment 100, such as, for example, a FreeBSD, Linux, OS X, UNIX, Windows, or other operating system. The operating system may be a standard operating system, an embedded operating system, or a real-time operating system. For example, the host operating system 315 may be a Windows operating system such as Windows 7 or Windows Server 2008, a Linux operating system such as Ubuntu or Red Hat Enterprise Linux, or a Macintosh operating system such as OS X or OS X Server. The client operating system 355 may be, for example, Linux, Blackberry OS, OS X, Windows, or other operating system. In one embodiment, the client operating system 355 is a Linux-derived operating system, such as Android, MeeGo, ThinStation, Ubuntu, webOS, or the like. In another embodiment, the client operating system 355 is a FreeBSD operating system, such as OS X, iOS, or the like, or a Windows operating system, such as Windows 7, Windows CE, Windows Vista, Windows XP, or Windows XPe.

In some environments, such as a "hot" desktop environment, several workstations are offered to workers or visitors on a first-come basis, or an environment in which users are mobile and switch back and forth between desktops computers and mobile devices on a regular basis. As mention above, in conventional environments there is no mechanism to seamlessly transfer a desktop share session that employs a UC session and a VDI session to another device by virtue of the user logging in to another endpoint device. To offer a seamless handoff, host UC application 320 incorporates UC and VDI seamless handoff process logic 500. Briefly, process logic 500 allows both the UC and VDI sessions to seamlessly migrate to a second device when the user logs in to another device. Process logic 500 is described generally in connection with FIG. 4 and by way of a specific example in connection with FIGS. 3A and 3B.

In this example, a user that is logged in to client endpoint device 205(1) desires to move to client endpoint device 205(2), e.g., another desktop computer or mobile device. The user logs in to client endpoint device 205(2) and by virtue of the login, the UC and VDI seamless handoff process logic 500 allows a seamless handoff of those sessions to endpoint 205(2). The corresponding call control session 420, application-to-application session 440, VDI session 405, and media transport session 435, are transferred from endpoint 205(1) to endpoint 205(2). This is illustrated by the dashed lines indicating call control session 470, application-to-application session 460, VDI session 450, and media transport session 480. The sessions 450, 460, 470, and 480, operate in much the same manner as their corresponding predecessor sessions, as described above.

Figure 3A:
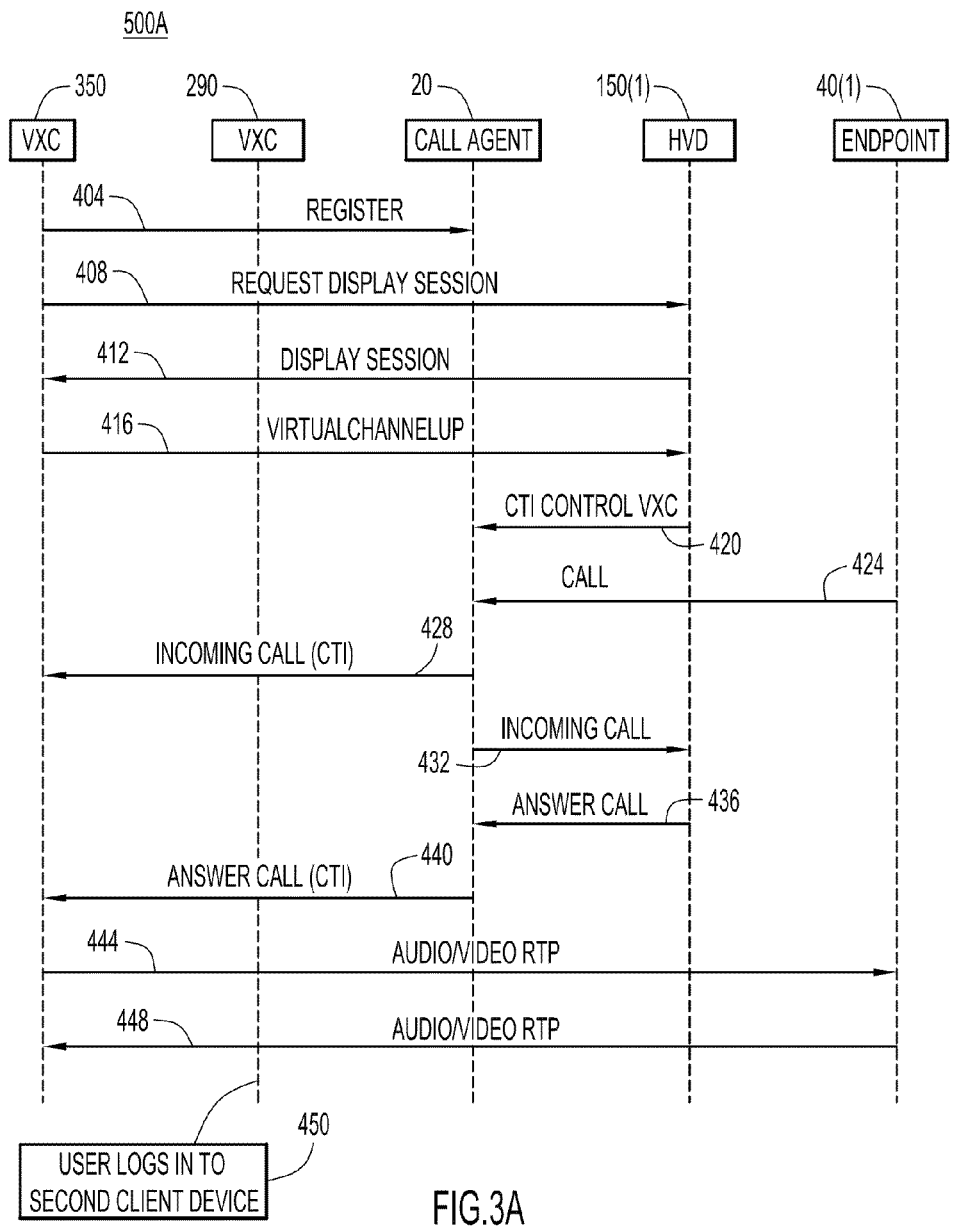
FIGS. 3A and 3B illustrate an example of a call flow in which UC and VDI sessions are established for a first client endpoint device and seamlessly transferred to a second client endpoint device.
Figure 3B:
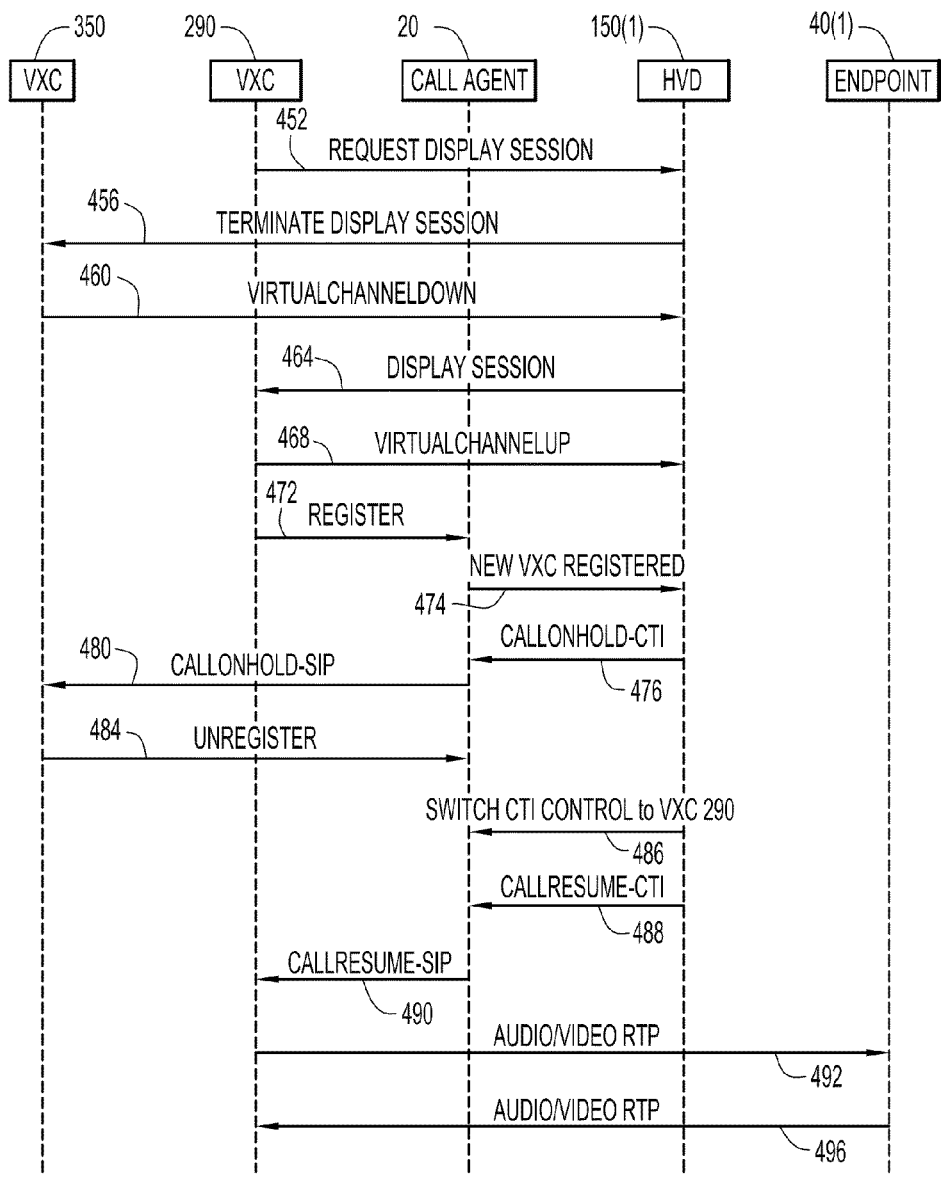

FIGS. 3A and 3B illustrate an example of a call flow in UC and VDI sessions established for a first client endpoint device, e.g., client endpoint device 205(1), via VXC 350, the call agent 20, and the remote party endpoint 40(1), and seamlessly transferred to a second client endpoint device, e.g., client endpoint device 205(2). Although the call flow is described with reference to the SIP and CTI protocols, it is understood that any suitable protocol may be used with the appropriate adjustments to one or more steps, and also that some of the steps depicted have been omitted in the interests of simplicity and conciseness. It is also understood that the call flow omits the use of an application-to-application session, as such a session is not required.

In FIG. 3A, UC and VDI sessions are established between endpoint 205(1) and remote endpoint 40(1). This process is monitored by UC and VDI seamless handoff process logic 500 as a specific example, at reference numeral 500A. At 404, VXC 350 registers with the call agent 20. The establishment of an association between the client UC protocol stack 365 (FIG. 2) and the call agent 20 is referred to as "registration." Such registration can take many forms and should not be construed as requiring any specific form of connection establishment or endpoint identification. At 408, the HVD display session is requested from HVD 150(1). At 412, the display session is established and the hosted display is rendered on endpoint 205(1) using display 250. At 416, the virtual channel is reported as "up" and the VDI session is operational. At 420, HVD 150(1) establishes a CTI call control with call agent 20.

In this example, remote endpoint 40(1) initiates a call to client endpoint 205(1). It should be understood that client endpoint 205(1) could initiate a call with remote endpoint 40(1) and parts of the call signaling would flow in the opposite direction from that presently described. In other words, client endpoint device 205(1) may use an input device such as a mouse, keyboard, or the like to request or receive a call (with user inputs being translated and sent as VDI input over the VDI session). At 424, remote endpoint 40(1) initiates a call to client endpoint 205(1) via call agent 20. At 428, call agent 20 signals VXC 350 that there is an incoming call. At 432, the call agent, nearly simultaneously with step 428, notifies HVD 150(1) of the incoming call and a call answer message may appear on display 250 and/or a ringtone may be generated for a headset or IP phone attached to client endpoint 205(1). At 436, the user answers the incoming IP phone call by picking up the handset or otherwise clicks on the call notification rendered on the display. At 440, call agent 20 signals VXC 350 that the call is answered. At 444 and 448, an RTP audio and/or audio/video session is established between endpoints and the call commences. A desktop share between endpoints, e.g., a WebEx or multi-party video/application share conference, may also accompany the call. The host UC application 320 (FIG. 2) adapts its GUI to reflect the ongoing call creation process.

At some point, the user decides to change endpoint devices, and at 450 logs in to a second or another client device 205(2). The new login, if successful, will eventually terminate all sessions with the first client device 205(1). Process logic 500A continues in FIG. 3B. After a successful login, at 452, VXI 290 requests a display session with HVD 150(1). At 456, HVD 150(1) terminates the display session with the client endpoint, e.g., client endpoint 205(1). At 460, the termination is accomplished by taking the virtual channel (VDI session) down, and at 464, a new display session is requested by VXC 290. At 468, the virtual channel is reported as "up" and the VDI session is operational.

Further, as a result of the login, at 472, VXC 290 registers with the call agent 20, and at 474, call agent 20 sends a message to HVD 150(1) that is configured to trigger call hold signaling by HVD 150(1). At 476, HVD 150(1) places the original call on hold with call agent 20 using CTI signaling. At 480, call agent 20 relays the "call on hold" to VXC 350. The call on hold signaling may indicate that this type of call on hold is associated with a client endpoint transfer, as opposed to a normal call on hold signal, thus allowing the VXC to unregister, or otherwise unregister by virtue of "knowing" that the virtual channel was taken down at 360. Additional software or firmware may be added to VXCs in order to facilitate this process.

At 484, VXC unregisters with call agent 20. At 486, HVD 150(1) signals call agent 20 to switch call control CTI signaling to VXC 290. At 488, HVD 150(1) CTI signals call agent 20 to resume the call with VXC 290. At 490, call agent 20 SIP signals VXC 290 to resume the call. At 492 and 496, upon receiving the call resume signal, RTP audio and or audio/video sessions are established between VXC 290 and remote endpoint 40(1). At this point, the UC and VDI, as well as any application-to-application, sessions are complete without any user action other than a login to another device. Thus, the user experience is enhanced relative to conventional HVD environment that support UC.

In addition, enhancements may be introduced to suppress music-on-hold during the transfer of UC and VDI sessions to ensure that other participants to the call are not interrupted by music-on-hold, i.e., the music that is normally transmitted to an on hold individual in attempt to alleviate the boredom of being on hold. In addition, when tablet or portable devices are used and the current OS on these devices allows only one application to be active at any given time (thereby conserving battery life), it is desirable that the VDI client and UC elements (SIP Stack and Media Engine) are all part of the one process in the portable device's OS. Having one process further allows the tight coupling for VDI session control and the UC signaling for UC active sessions transferred to the active VDI endpoint device without any additional user interaction.

It should be understood that the techniques described herein are not "dusting" as is known in some call session scenarios, since dusting requires the user to indicate to which device in their vicinity that they would like to move a voice/video session. In a dusting scenario, with a device that is UC enabled, the user would have to first login to the desktop from the new device and then somehow figure out how to transfer the call to the endpoint even though the VDI session provides the same display as the last one, thereby adding confusion to the user.

Figure 4:
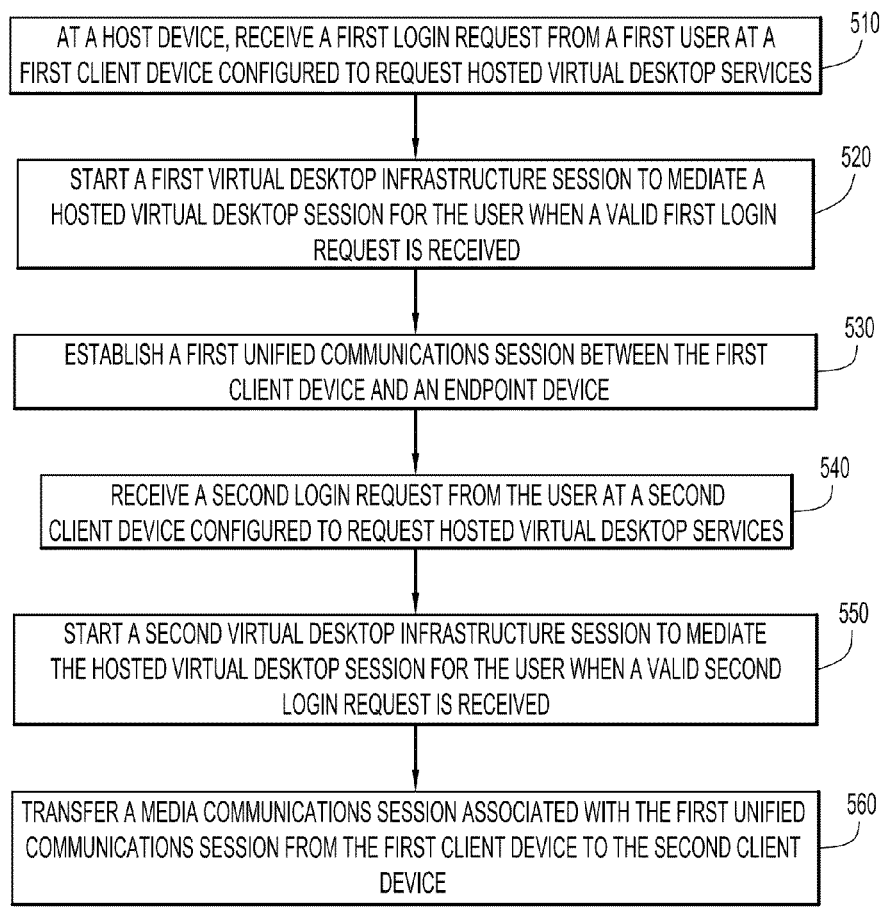
FIG. 4 is an example of a flow chart generally depicting seamless hand-off for combined UC and VDI sessions.

Referring now to FIG. 4, an example of a flow chart is shown that generally depicts operations of the UC and VDI seamless handoff process logic 500 for the seamless transfer of UC and VDI sessions from one device to another. At 510, at a host device, e.g., host 105, a first login request is received from a user at a first client device, e.g., client endpoint 205(1) (FIGS. 1 and 2), that is configured to request hosted virtual desktop services (e.g., from HVD 150(1)). At 520, a first virtual desktop infrastructure session is started to mediate a hosted virtual desktop session for the user when a valid first login request is received, by way of a VDI communications link. At 530, a first unified communications session is established between the first client device and an endpoint device.

At 540, a second login request is received from the user at a second client device, e.g., endpoint device 205(2), that is configured to request hosted virtual desktop services, e.g., from HVD 150(1). At 550, a second virtual desktop infrastructure session is started to mediate the hosted virtual desktop session for the user when a valid second login request is received. At 560, a media communications session associated with the first unified communications session is transferred from the first client device to the second client device. The VDI, application-to-application, call control, and media transport links are all transferred to the second client device.

Further techniques include registering the second client device with a call manager and the HVD receives a notification from the call manager that the second client device has registered with the call manager. A second unified communications session is established between the second client device and the endpoint device configured to resume the media communication session when the transfer is complete. The first virtual desktop infrastructure session is then terminated. A first message is sent to a call manager, the first message comprising information configured to place the media communication session on hold while transferring the media communication session from the first client device to the second client device. Music-on-hold may be suppressed while the media communication session is on hold in order to avoid any interruption in the user experience. The techniques described herein result in negligible latency such that even if music were played, it would be of such short duration that it may not be noticed at all by the user.

The first client device also receives a message from the call manager comprising information configured to place communications media on hold. This signals the first client device to unregister with the call manager. The HVD also sends to the call manager a message comprising information configured to resume the media communication session with the second client device. A message is also sent to the call manager, the message comprising information configured to switch call control signaling from the first client device to the second client device. Any sessions associated with the first client device with respect to UC and VDI may be terminated or left to timeout.

The seamless handoff techniques described herein provide several advantages. For example, they provide for seamless hand-off of all elements of a UC conference (Voice, Video, desktop share, VDI session) in one user-friendly action by way of a login to a new VDI session on a second device. From a user's perspective, the UC session appears to be part of the VDI desktop and the user does not need to understand or comprehend that the associated sessions are actually local to the client device such that if the user changes the client endpoint desktop that they are viewing, it is logical for the user to assume that the UC voice and video would naturally be on the new endpoint device without requiring any interaction. In other words, these techniques allow a seamless client endpoint transition while still retaining the advantage of having the voice and video data terminate at the endpoint not in the HVD, i.e., the media session link remains independent of the UC and VDI sessions.

The above description is intended by way of example only. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments.

What is claimed is:

1. A method comprising:
at a host device, receiving from a user at a first client device a first login request configured to request hosted virtual desktop services;
starting a first virtual desktop infrastructure session to mediate a hosted virtual desktop session for the user when a valid first login request is received;
establishing a first unified communications session between the first client device and an endpoint device;
receiving from the user at a second client device a second login request configured to request hosted virtual desktop services;
starting a second virtual desktop infrastructure session to mediate the hosted virtual desktop session for the user when a valid second login request is received; and
transferring a media communications session associated with the first unified communications session from the first client device to the second client device.

2. The method of claim 1, further comprising:
registering by the second client device with a call manager; and
receiving from the call manager a notification that the second client device has registered with the call manager.

3. The method of claim 1, further comprising:
establishing between the second client device and the endpoint device a second unified communications session configured to resume the media communications session when the transfer is complete.

4. The method of claim 1, further comprising terminating the first virtual desktop infrastructure session.

5. The method of claim 1, further comprising:
sending to a call manager a first message comprising information configured to place the media communication session on hold while transferring the media communications session from the first client device to the second client device.

6. The method of claim 5, further comprising suppressing music-on-hold while the media communications session is on hold.

7. The method of claim 5, further comprising:
receiving at the first client device a second message from the call manager, the second message comprising information configured to place communications media on hold; and
unregistering the first client device with the call manager.

8. The method of claim 5, further comprising:
sending to the call manager a third message comprising information configured to switch call control signaling from the first client device to the second client device.

9. The method of claim 5, further comprising:
sending to the call manager a fourth message comprising information configured to resume the media communications session with the second client device.

10. An apparatus comprising:
a network interface unit configured to communicate over a network; and
a processor configured to:
receive from a user at a first client device a first login request configured to request hosted virtual desktop services;
start a first virtual desktop infrastructure session to mediate a hosted virtual desktop session for the user when a valid first login request is received;
establish a first unified communications session between the first client device and an endpoint device;

receive from the user at a second client device a second login request configured to request hosted virtual desktop services;

start a second virtual desktop infrastructure session to mediate the hosted virtual desktop session for the user when a valid second login request is received; and transfer a media communications session associated with the first unified communications session from the first client device to the second client device.

11. The apparatus of claim 10, wherein the processor is further configured to:

establish between the second client device and the endpoint device a second unified communications session configured to resume the media communications session when the transfer is complete.

12. The apparatus of claim 10, wherein the processor is further configured to terminate the first virtual desktop infrastructure session.

13. The apparatus of claim 10, wherein the processor is further configured to:

send to a call manager a first message comprising information configured to place the media communications session on hold while the transfer of the media session from the first client device to the second client device is in progress.

14. The apparatus of claim 13, wherein the processor is further configured to suppress music-on-hold while the media communications session is on hold.

15. The apparatus of claim 13, wherein the processor is further configured to:

send to the call manager a second message comprising information configured to resume the media communications session with the second client device.

16. The apparatus of claim 13, wherein the processor is configured to:

receive at the first client device from the call manager a message comprising information configured to place communications media on hold; and unregister the first client device with the call manager.

17. The apparatus of claim 10, wherein the processor is further configured to:

send to the call manager a third message comprising information configured to switch call control signaling from the first client device to the second client device.

18. The apparatus of claim 10, wherein the processor is further configured to:

register by the second client device with a call manager;

receive from the call manager a notification that the second client device has registered with the call manager.

19. One or more non-transitory computer readable storage media storing instructions that, when executed by a processor, cause the processor to:

receive from a user at a first client device a first login request configured to request hosted virtual desktop services;

start a first virtual desktop infrastructure session to mediate a hosted virtual desktop session for the user when a valid first login request is received;

establish a first unified communications session between the first client device and an endpoint device;

receive from the user at a second client device a second login request configured to request hosted virtual desktop services;

start a second virtual desktop infrastructure session to mediate the hosted virtual desktop session for the user when a valid second login request is received; and transfer a media communications session associated with the first unified communications session from the first client device to the second client device.

20. The non-transitory computer readable storage media of claim 19, further comprising instructions that, when executed by a processor, cause the processor to:

establish between the second client device and the endpoint device a second unified communications session configured to resume the media communications session when the transfer is complete.

21. The non-transitory computer readable storage media of claim 19, further comprising instructions that, when executed by a processor, cause the processor to terminate the first virtual desktop infrastructure session.

22. The non-transitory computer readable storage media of claim 19, further comprising instructions that, when executed by a processor, cause the processor to:

send to a call manager a first message comprising information configured to place the media communications session on hold while the transfer of the media communications session from the first client device to the second client device is in progress.

23. The non-transitory computer readable storage media of claim 22, further comprising instructions that, when executed by a processor, cause the processor to suppress music-on-hold while the media communications session is on hold.

24. The non-transitory computer readable storage media of claim 22, further comprising instructions that, when executed by a processor, cause the processor to:

send to the call manager a second message comprising information configured to resume the media communications session with the second client device.

25. The non-transitory computer readable storage media of claim 22, further comprising instructions that, when executed by a processor, cause the processor to:

receive at the first client device from the call manager a message comprising information configured to place communications media on hold; and unregister the first client device with the call manager.

26. The non-transitory computer readable storage media of claim 19, further comprising instructions that, when executed by a processor, cause the processor to:

send to the call manager a third message comprising information configured to switch call control signaling from the first client device to the second client device.

27. The non-transitory computer readable storage media of claim 19, further comprising instructions that, when executed by a processor, cause the processor to:

register by the second client device with a call manager;

receive from the call manager a notification that the second client device has registered with the call manager.

* * * * *

UNITED STATES PATENT AND TRADEMARK OFFICE
CERTIFICATE OF CORRECTION

PATENT NO. : 8,966,093 B2
APPLICATION NO. : 13/487338
DATED : February 24, 2015
INVENTOR(S) : Smyth et al.

It is certified that error appears in the above-identified patent and that said Letters Patent is hereby corrected as shown below:

In the Claims

In Column 13, Line 23 please insert --communications-- after "media"

Signed and Sealed this
Fifth Day of April, 2016

Michelle K. Lee
*Director of the United States Patent and Trademark Office*